US010688959B2

(12) United States Patent
Bryant

(10) Patent No.: US 10,688,959 B2
(45) Date of Patent: Jun. 23, 2020

(54) VEHICLE OCCUPANT RESTRAINT SYSTEM FOR WHEELCHAIR USERS AND VEHICLE INCORPORATING THE SYSTEM

(71) Applicant: GM GLOBAL TECHNOLOGY OPERATIONS LLC, Detroit, MI (US)

(72) Inventor: Wade W. Bryant, Grosse Pointe Farms, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 76 days.

(21) Appl. No.: 16/046,329

(22) Filed: Jul. 26, 2018

(65) Prior Publication Data

US 2020/0031309 A1 Jan. 30, 2020

(51) Int. Cl.
*B60R 22/24* (2006.01)
*B60R 22/20* (2006.01)
*B60R 22/00* (2006.01)
*A61G 3/08* (2006.01)

(52) U.S. Cl.
CPC .............. *B60R 22/24* (2013.01); *B60R 22/00* (2013.01); *B60R 22/20* (2013.01); *A61G 3/0808* (2013.01)

(58) Field of Classification Search
CPC .............................. A61G 3/0808; B60R 22/24
See application file for complete search history.

(56) References Cited

U.S. PATENT DOCUMENTS

| 4,103,934 | A | * | 8/1978 | Arnholt | B60R 22/00 |
| | | | | | 280/751 |
| 4,265,478 | A | * | 5/1981 | Korsgaard | A61G 3/0808 |
| | | | | | 105/159 |
| 4,455,046 | A | | 6/1984 | Linderoth | |
| 4,458,919 | A | * | 7/1984 | Kawashima | A61G 3/0808 |
| | | | | | 280/751 |
| 4,511,171 | A | * | 4/1985 | Petersen | A61G 3/0808 |
| | | | | | 188/2 F |
| 5,026,225 | A | | 6/1991 | McIntyre | |
| 5,293,950 | A | * | 3/1994 | Marliac | A61G 3/0808 |
| | | | | | 180/11 |
| 6,276,721 | B1 | * | 8/2001 | Romeo | B60R 22/19 |
| | | | | | 280/483 |
| 6,293,588 | B1 | * | 9/2001 | Clune | B60R 21/02 |
| | | | | | 180/268 |
| 6,428,254 | B2 | | 8/2002 | Craft | |
| 7,040,847 | B1 | | 5/2006 | Cardona | |
| 7,425,110 | B2 | * | 9/2008 | Ditch | A61G 3/0808 |
| | | | | | 410/19 |
| 8,414,234 | B2 | | 4/2013 | Girardin et al. | |

(Continued)

FOREIGN PATENT DOCUMENTS

DE 3204665 A1 * 8/1983 .......... A61G 3/0808
EP 2353564 A2 * 8/2011 .............. A61G 3/08

*Primary Examiner* — Nicole T Verley

(57) ABSTRACT

An occupant restraint system for a wheelchair user in a vehicle that includes a pivot brace connected to the vehicle structure, a restraint hoop pivotally connected to the pivot brace and adapted to pivot between a stowed position above a wheelchair/occupant receiving area in the vehicle and a deployed position that is forward of a wheelchair/occupant when positioned in the wheelchair/occupant receiving area in the vehicle, and an occupant restraint belt connected to the restraint hoop.

7 Claims, 5 Drawing Sheets

(56) References Cited

U.S. PATENT DOCUMENTS

| | | | | |
|---|---|---|---|---|
| 8,672,356 B2* | 3/2014 | Inaguma | ............... | A61G 3/08 |
| | | | | 280/250.1 |
| 9,782,309 B2* | 10/2017 | Bell | ............... | B60P 3/079 |
| 9,994,180 B2* | 6/2018 | Evans | ............... | B60R 21/18 |
| 10,130,529 B2* | 11/2018 | Gale | ............... | A61G 3/0808 |
| 2011/0210598 A1* | 9/2011 | Kovac | ............... | B60R 21/12 |
| | | | | 297/466 |

* cited by examiner

VEHICLE OCCUPANT RESTRAINT SYSTEM FOR WHEELCHAIR USERS AND VEHICLE INCORPORATING THE SYSTEM

FIELD

The present disclosure relates to a vehicle occupant restraint system for wheelchair users.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

There is a well-recognized need to provide access to mobility services for physically challenged passengers. Many physically challenged passengers travel in a wheelchair and there is a need to provide accommodations for wheelchairs in mobility services. There are many existing systems and methods for securing a wheelchair occupant and wheelchair in a vehicle. However, these systems have many challenges.

Existing vehicle occupant restraint system for wheelchair users which may be designed for a wider range of vehicles may require modification of a wheelchair and/or the vehicle in which the wheelchair occupant is intended to be transported. Specialized wheelchair and vehicle modifications may be acceptable for a vehicle which may be personal to the owner of the wheelchair and vehicle, however, such systems are not practical for vehicles that may be shared.

Typical existing wheelchair occupant restraint systems rely upon occupant restraint belt systems which may be anchored to the rear of the occupant. A problem with these systems is that the wheelchair in which the occupant is seated generally includes arm rests and large wheels that block direct access to the torso and hip area of the occupant from a rearwardly positioned anchor. In order for these systems to be used, the belts must be threaded through the wheelchair. For example, in some systems the belt must be threaded underneath the wheelchair armrest and between spokes in the wheels of the wheelchair. These systems are quite difficult and complicated to use and, therefore, require significant manual interaction and many times require the assistance of someone other than the wheelchair occupant. Interaction with another person may require undesirably contact between the wheelchair occupant and the other person which may invade the personal space of the wheelchair occupant.

There is a need to provide an occupant restraint system for a wheelchair user in a vehicle that does not require modification of a wheelchair, which may be used with wheelchairs having a wide variety of configurations, and which may minimize the need for involvement with a person other than the wheelchair occupant.

SUMMARY

In an exemplary aspect, an occupant restraint system for a wheelchair user in a vehicle includes a pivot brace connected to the vehicle structure, a restraint hoop pivotally connected to the pivot brace and adapted to pivot between a stowed position above a wheelchair/occupant receiving area in the vehicle and a deployed position that is forward of a wheelchair/occupant when positioned in the wheelchair/occupant receiving area in the vehicle, and an occupant restraint belt connected to the restraint hoop.

In this manner, a wheelchair occupant in a vehicle may be secured with occupant restraint belts that are presented to the occupant from the front, thereby obviating the problems of restraint belt systems being presented to the occupant from the rear such as, for example, having to thread the belt(s) through the wheelchair to adequately secure the occupant.

In another exemplary aspect, the pivot brace provides a pivot connection to the restraint hoop on opposing sides of the wheelchair/occupant receiving area.

In another exemplary aspect, at least one of the pivot connections includes a ratcheting and locking pivot.

In another exemplary aspect, the occupant restraint belt includes a shoulder belt that is connected to the restraint hoop at a distal end of the shoulder belt and to a vehicle structure at a proximal end of the shoulder belt.

In another exemplary aspect, the proximal end of the shoulder belt is connected to the vehicle structure at a position that is behind and above the wheelchair/occupant receiving area.

In another exemplary aspect, the restraint hoop includes a pair of articulating hip arms extending rearwardly from the restraint hoop toward the wheelchair/occupant receiving area.

In another exemplary aspect, the occupant restraint belt includes a lap belt having ends that are each connected to a respective one the pair of articulating hip arms.

In another exemplary aspect, the system further includes at least one ratcheting mechanism in one of the pair of articulating hip arms and connected to a respective end of the lap belt.

In another exemplary aspect, at least one of the pair of articulating hip arms is pivotally connected to the restraint hoop.

In another exemplary aspect, at least one of the pair of articulating hip arms is slidably connected to the restraint hoop.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
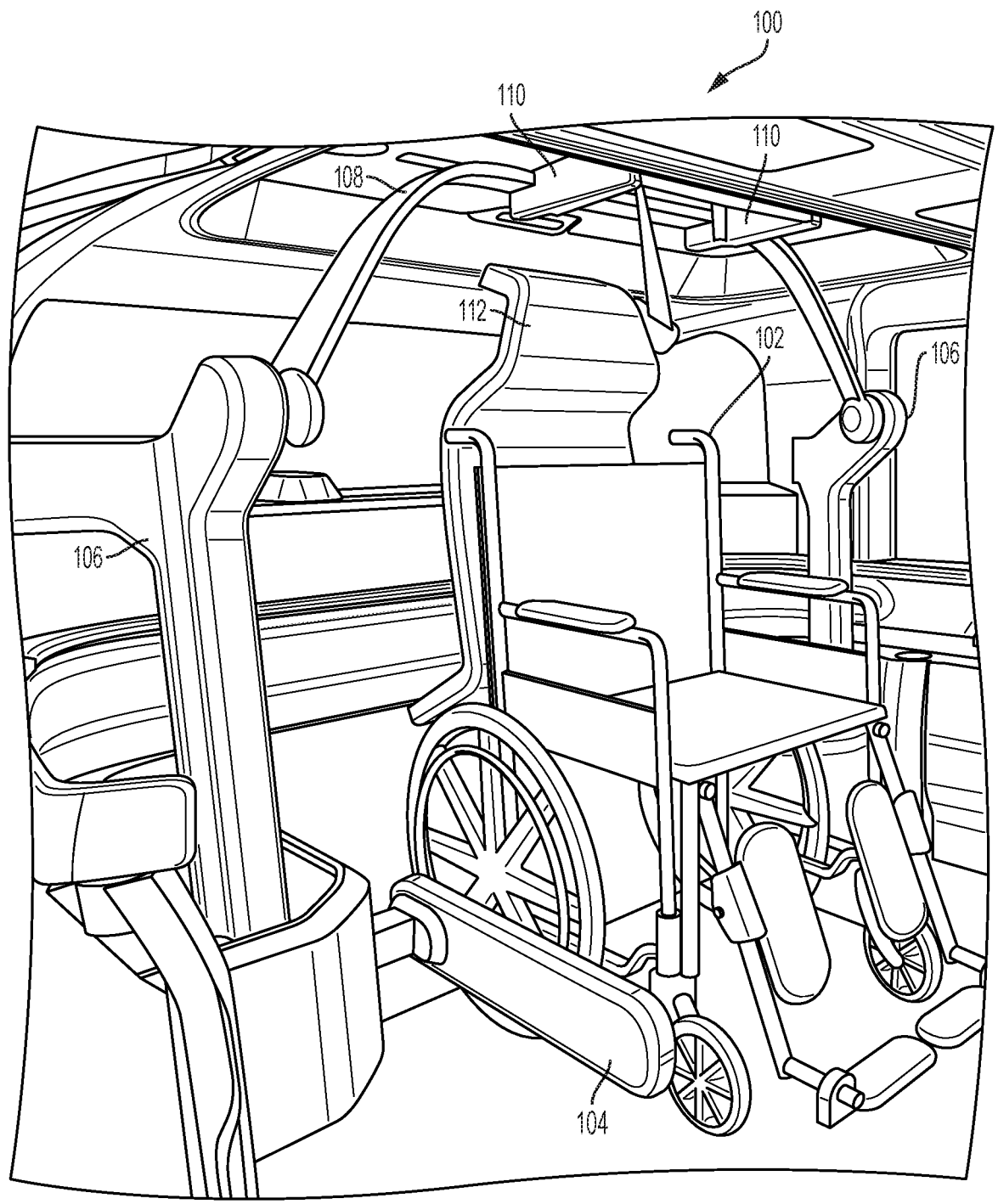
FIG. 1 is a perspective view of an exemplary vehicle occupant restraint system for a wheelchair user in accordance with the present disclosure in a first configuration.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 1 is a perspective view of an exemplary vehicle occupant restraint system 100 for a wheelchair user in accordance with the present disclosure in a first configuration. The first configuration corresponds to a stowed configuration in which the system 100 is open to permit positioning of a wheelchair 102 into a desired position. The wheelchair is secured in the desired position by a wheelchair securing system 104. It is to be understood that the vehicle occupant restraint system 100 of the present disclosure may be operated with any type or configuration of wheelchair and wheelchair securing system 104.

The vehicle occupant restraint system 100 includes a pivot brace 106 on opposing sides of the wheelchair and wheelchair occupant (not shown). The pivot brace 106 is connected to the structure and provides structural support to a restraint hoop 108 that is pivotally connected to the pivot brace 106. The restraint hoop 108 includes articulating hip arms 110 which are adapted to be positioned on either side of a hip area of a wheelchair occupant. Optionally, the vehicle occupant restraint system 100 may include a forward reaction surface 112. The vehicle occupant restraint system 100 further includes a shoulder belt 114 and a lap belt 116. One end of the shoulder belt 114 is connected to the vehicle, preferably at a location vertically oriented above and behind the wheelchair and occupant. The other end of the shoulder belt 114 may be connected to one of the articulating hip arms 110 in such a manner as to cross the torso of a wheelchair occupant when in a deployed configuration. Proximal ends of the articulating hip arms 110 are connected to the restraint hoop 108 and ends of the lap belt 116 extend from and into distal ends of the articulating hip arms 110. As illustrated by hidden lines in FIG. 4, the ends of the lap belt 116 are attached to the articulating hip arms 110 via one or more ratcheting mechanisms 118. The ratcheting mechanisms 118 enable the lap belt 116 to adjust the deployed length to the size and shape of an occupant of the wheelchair. The articulating hip arms 110 may further include pivoting and/or translating joints 112 which flexibly enable each of the articulating hip arms 110 to adapt to wheelchair occupants of different sizes and shapes.

Figure 2:
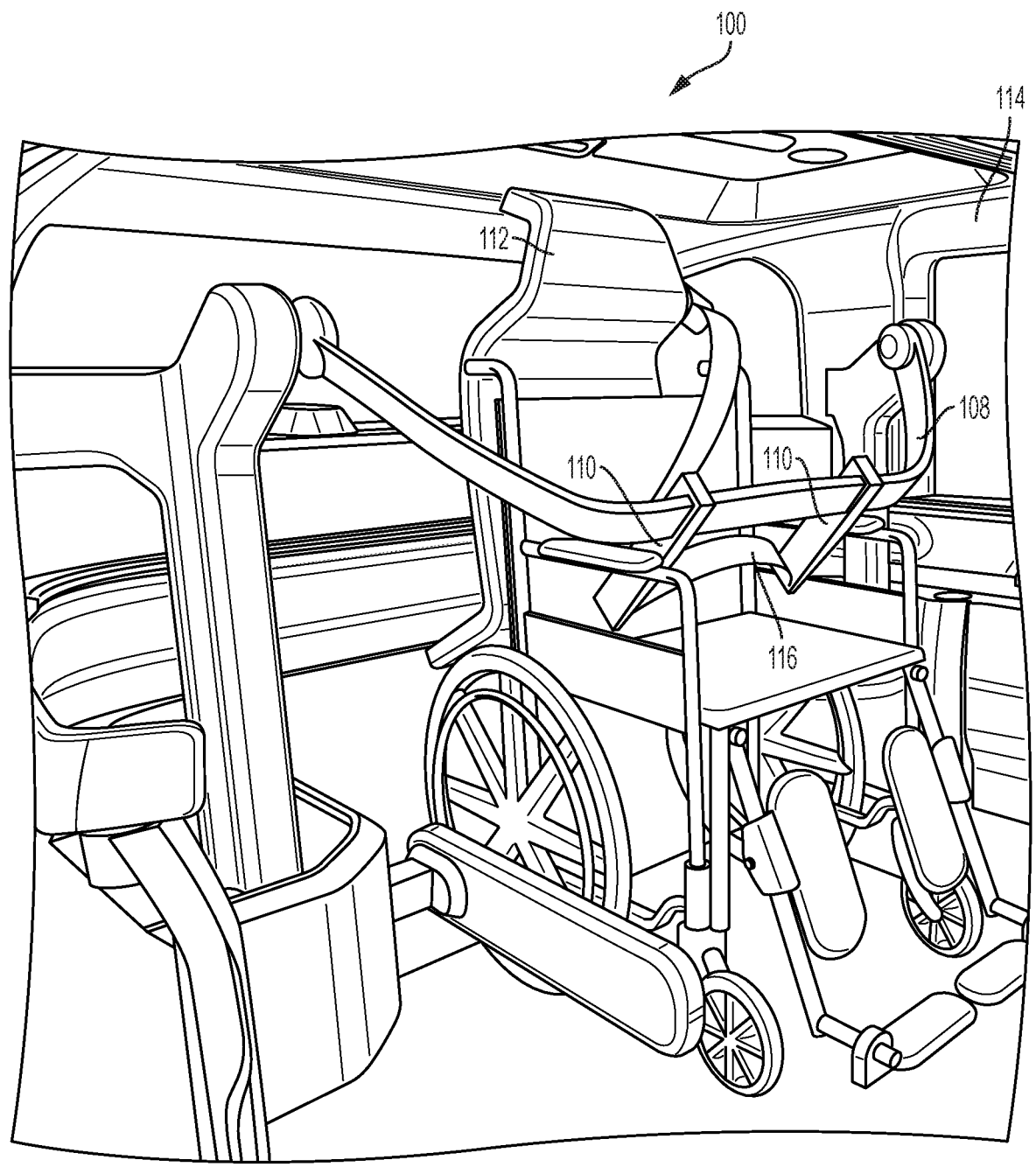
FIG. 2 is another perspective view of the vehicle occupant restraint system of FIG. 1 in a second configuration.
Figure 3:
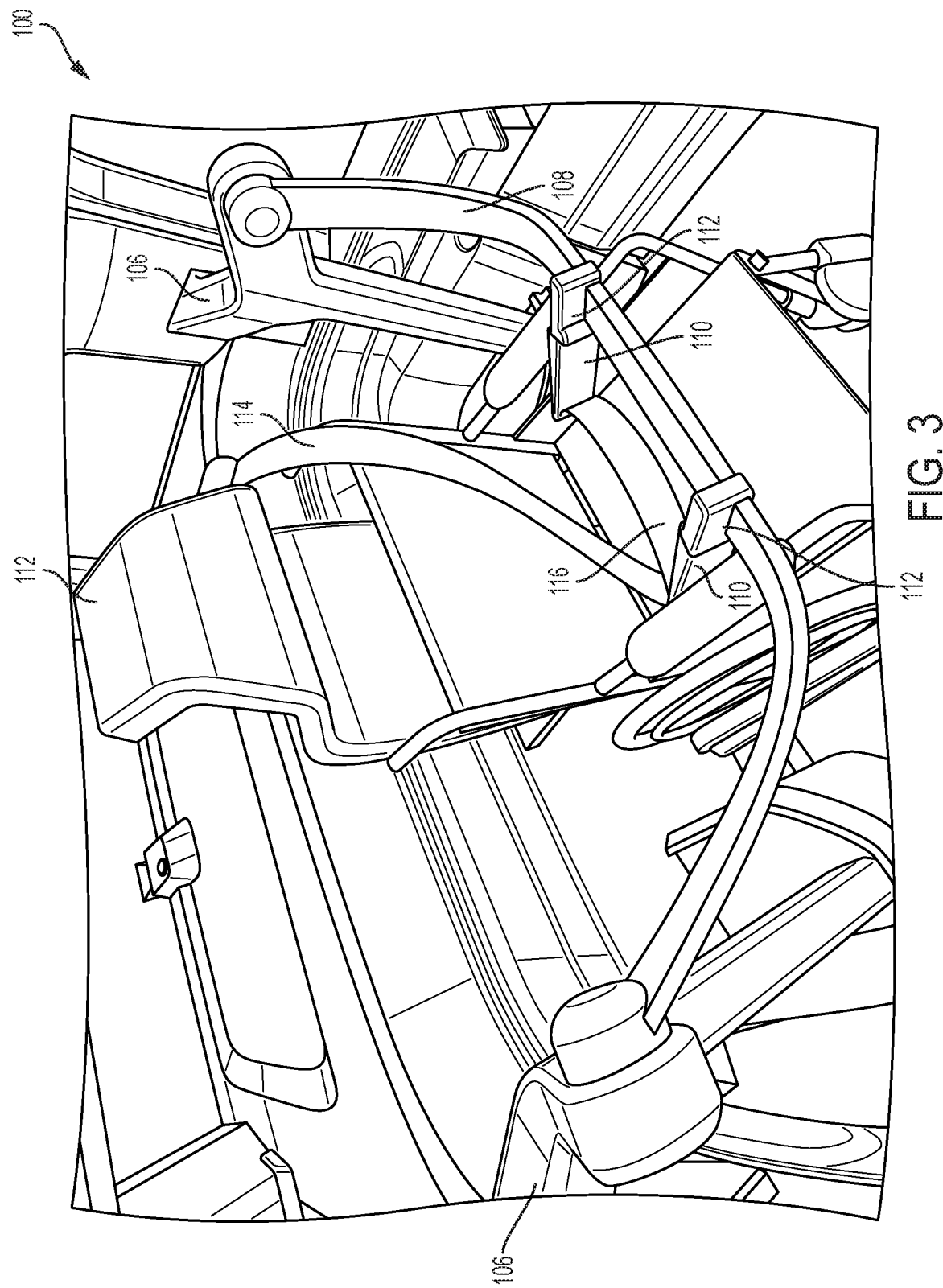
FIG. 3 is another perspective view of the vehicle occupant restraint system of FIG. 1 in the second configuration.
Figure 4:
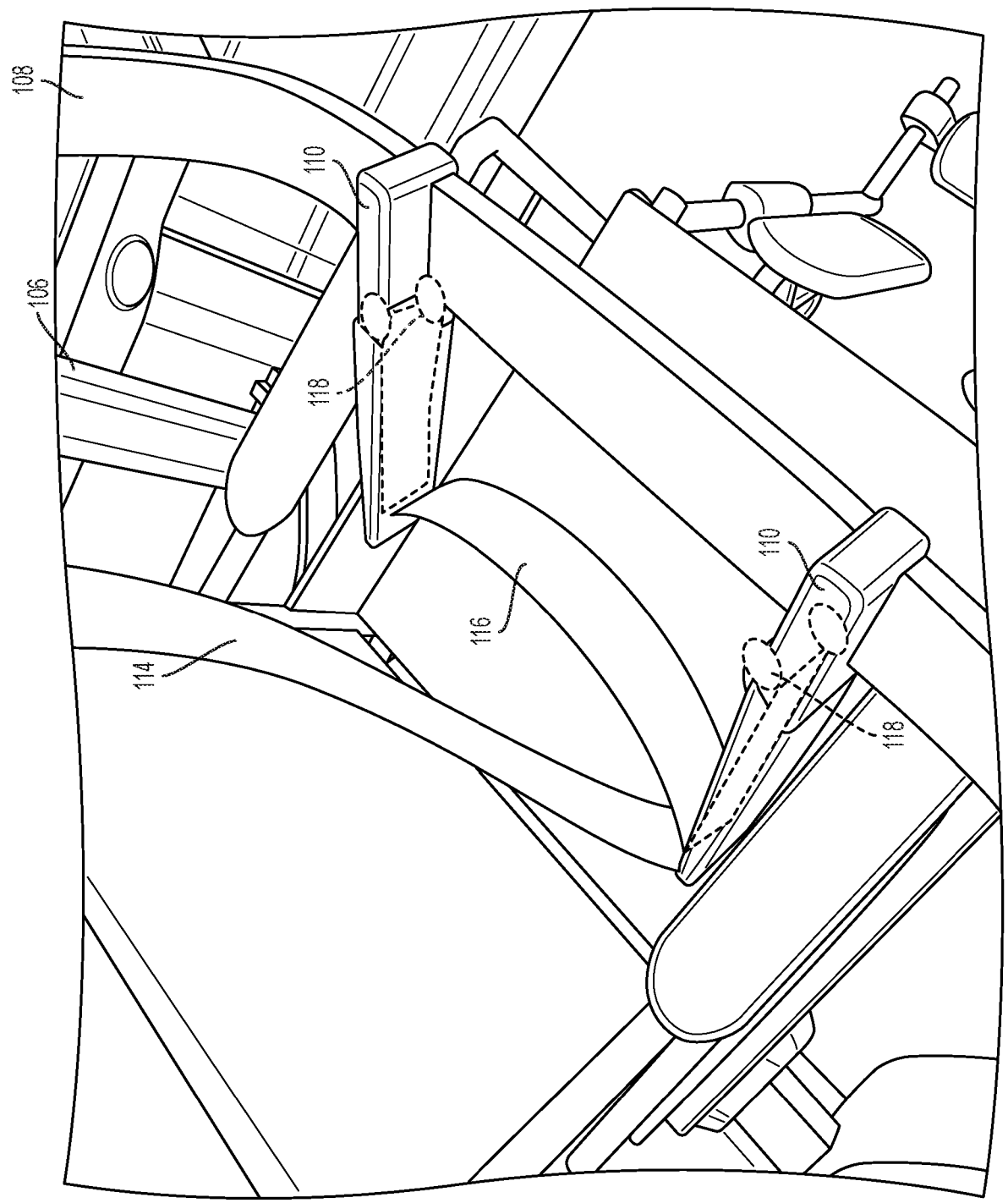
FIG. 4 is a closer perspective view of the vehicle occupant restraint system of FIG. 1 in the second configuration.
Figure 5:
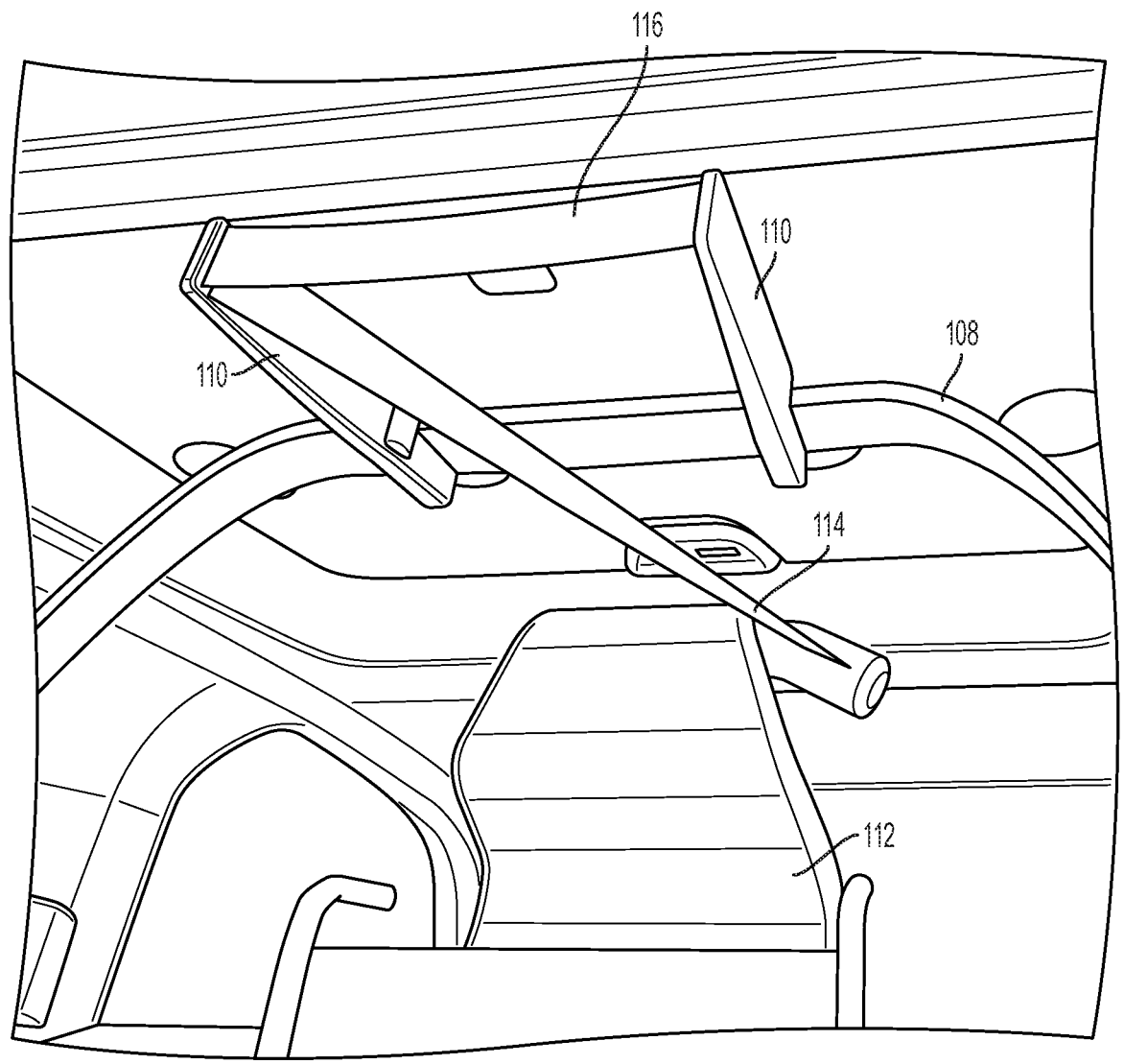
FIG. 5 is yet another perspective view of the vehicle occupant restraint system of FIG. 1 in the first configuration.

The pivoting of the restraint hoop 108 from the stowed configuration (as illustrated in FIGS. 1 and 5) to the deployed configuration (as illustrated in FIGS. 2-4) may be accomplished in many ways. The vehicle occupant restraint system for a wheelchair occupant of the present disclosure is not limited to any method or system which might enable transitions between the stowed and deployed configurations. In an exemplary embodiment, the pivoting connection between the pivot brace 106 and the restraint hoop 108 may rely upon a motor controlled pivot (not shown) and/or a manually actuated and ratcheting pivot mechanism (not shown). For a motor controlled pivot, a user interface such as a button or software application on a user accessible device, may trigger operation of the motor controlled pivot. Alternatively, other systems or sensors may trigger operation of the vehicle occupant restraint system such as, for example, a vision system which recognizes the positioning of the wheelchair and occupant and/or other sensors. In response to the vision system signal positioning of the wheelchair and occupant may be determined such that the vehicle occupant restraint system may transition from the stowed configuration to the deployed configuration when the occupant is appropriately positioned. In this manner, the system may provide the ability to properly restrain the occupant in the wheelchair without manual intervention. Alternatively, the vehicle occupant restraint system 100 may be manually reconfigured, either by the wheelchair occupant or through the assistance of another person. For example, a wheelchair occupant may manually pull the restraint hoop 108 from the stowed configuration to the deployed configuration. The pivoting connection between the pivot brace 106 and the restraint hoop 108 may be a ratcheting connection (not shown) that permits rotation from the stowed configuration to the deployed configuration and then holds the restraint hoop 108 in position. Further, the pivoting connection may include a release mechanism (not shown) whereby the occupant may unlock the restraint hoop 108 from being held in the deployed configuration and then lift the restraint hoop 108 back to the stowed position. The pivoting connection may be rotationally biased toward the stowed configuration against the pull of gravity using, for example, a torsion spring (not shown) to assist in lifting the restraint hoop 108 from the deployed configuration to the stowed configuration.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An occupant restraint system for a wheelchair occupant in a vehicle, the system comprising:
   a pivot brace connected to the vehicle structure;
   a restraint hoop pivotally connected to the pivot brace and adapted to pivot between a stowed position above a wheelchair/occupant receiving area in the vehicle and a deployed position that is forward of a wheelchair/occupant when positioned in the wheelchair/occupant receiving area in the vehicle; and
   an occupant restraint belt connected to the restraint hoop, wherein the occupant restraint belt comprises a shoulder belt that is connected to the restraint hoop at a distal end of the shoulder belt and to a vehicle structure at a proximal end of the shoulder belt.

2. The system of claim 1, wherein the pivot brace provides a pivot connection to the restraint hoop on opposing sides of the wheelchair/occupant receiving area.

3. The system of claim 1, wherein the proximal end of the shoulder belt is connected to the vehicle structure at a position that is behind and above the wheelchair/occupant receiving area.

4. An occupant restraint system for a wheelchair occupant in a vehicle, the system comprising:

a pivot brace connected to the vehicle structure;
a restraint hoop pivotally connected to the pivot brace and adapted to pivot between a stowed position above a wheelchair/occupant receiving area in the vehicle and a deployed position that is forward of a wheelchair/occupant when positioned in the wheelchair/occupant receiving area in the vehicle; and
an occupant restraint belt connected to the restraint hoop, wherein the restraint hoop comprises a pair of articulating hip arms extending rearwardly from the restraint hoop toward the wheelchair/occupant receiving area.

5. The system of claim 4, wherein the occupant restraint belt comprises a lap belt having ends that are each connected to a respective one of the pair of articulating hip arms.

6. The system of claim 4, wherein at least one of the pair of articulating hip arms is pivotally connected to the restraint hoop.

7. The system of claim 4, wherein at least one of the pair of articulating hip arms is slidably connected to the restraint hoop.

\* \* \* \* \*